(12) United States Patent
Wu et al.

(10) Patent No.: US 10,560,460 B2
(45) Date of Patent: Feb. 11, 2020

(54) MANAGEMENT OF DATA OF USER GROUPS AND MAINTENANCE OF COMMUNICATION THEREOF

(71) Applicant: DINGTALK HOLDING (CAYMAN) LIMITED, Grand Cayman (KY)

(72) Inventors: Zhenhao Wu, Hangzhou (CN); Xinglin Ma, Hangzhou (CN); Hang Chen, Hangzhou (CN)

(73) Assignee: Dingtalk Holding (Cayman) Limited, Grand Cayman (KY)

( * ) Notice: Subject to any disclaimer, the term of this patent is extended or adjusted under 35 U.S.C. 154(b) by 342 days.

(21) Appl. No.: 15/189,825

(22) Filed: Jun. 22, 2016

(65) Prior Publication Data
US 2016/0381035 A1 Dec. 29, 2016

(30) Foreign Application Priority Data

Jun. 26, 2015 (CN) .......................... 2015 1 0369383

(51) Int. Cl.
*H04L 29/06* (2006.01)
*H04L 12/58* (2006.01)
*G06F 21/62* (2013.01)

(52) U.S. Cl.
CPC ........ *H04L 63/104* (2013.01); *G06F 21/6218* (2013.01); *G06F 21/6245* (2013.01); *H04L 51/04* (2013.01); *H04L 51/28* (2013.01)

(58) Field of Classification Search
CPC ... H04L 63/104; H04L 51/04; G06F 21/6218; G06F 21/6245

(Continued)

(56) References Cited

U.S. PATENT DOCUMENTS 7,483,969 B2 * 1/2009 Chavda ................ G06Q 10/107
    709/203
7,836,088 B2 * 11/2010 Chavda ................ G06Q 10/107
    707/795

(Continued)

FOREIGN PATENT DOCUMENTS

CN        101645787 A      2/2010
CN        102065390 A      5/2011

(Continued)

OTHER PUBLICATIONS

PCT Search Report and Written Opinion dated Sep. 13, 2016 for PCT Application No. PCT/US16/38748, 10 pages.

(Continued)

*Primary Examiner* — Abu S Sholeman
*Assistant Examiner* — Thanh T Le
(74) *Attorney, Agent, or Firm* — Lee & Hayes, P.C.

(57) ABSTRACT

Methods and devices for management of group user data and/or maintenance of instant messaging groups. The methods may include receiving, by a computing device, a request for searching data of a first group user. For example, the request is initialized by a second group user via an instant messaging application. The computing device may determine a data search permission of the second group user on the data of the first group user, select a data item of the first group user in accordance with the data search permission, and return the data item to the second group user. Using techniques described herein, the implementations may enable users to view group contacts and perform access control to improve security of the group data and to avoid leakage of communication information of group users.

12 Claims, 11 Drawing Sheets

(58) Field of Classification Search
USPC .......................................................... 726/4
See application file for complete search history.

(56) References Cited

U.S. PATENT DOCUMENTS

| | | | |
|---|---|---|---|
| 2004/0143633 A1* | 7/2004 | McCarty | H04L 12/1813 709/206 |
| 2005/0149622 A1* | 7/2005 | Kirkland | H04L 51/04 709/207 |
| 2005/0223075 A1* | 10/2005 | Swearingen | H04L 51/04 709/207 |
| 2006/0015609 A1* | 1/2006 | Hagale | H04L 67/24 709/224 |
| 2006/0053208 A1 | 3/2006 | Laurila et al. | |
| 2006/0156022 A1* | 7/2006 | Grim, III | G06F 21/6245 713/182 |
| 2006/0236380 A1* | 10/2006 | Bransom | G06F 21/6218 726/6 |
| 2007/0168443 A1* | 7/2007 | Morgan | G06Q 10/107 709/207 |
| 2007/0208809 A1 | 9/2007 | Westman | |
| 2007/0213034 A1* | 9/2007 | Cai | H04M 3/4931 455/412.1 |
| 2007/0234216 A1 | 10/2007 | Fitzpatrick et al. | |
| 2008/0163075 A1* | 7/2008 | Beck | H04L 51/12 715/759 |
| 2008/0306905 A1 | 12/2008 | Clarkson et al. | |
| 2009/0030878 A1* | 1/2009 | Weir | G06F 16/335 |
| 2009/0083827 A1* | 3/2009 | Denner | G06Q 10/107 726/1 |
| 2009/0106376 A1 | 4/2009 | Tom et al. | |
| 2009/0165090 A1* | 6/2009 | Glasgow | H04L 51/04 726/3 |
| 2009/0172120 A1 | 7/2009 | Ruelas | |
| 2009/0282104 A1* | 11/2009 | O'Sullivan | G06Q 10/107 709/204 |
| 2010/0057754 A1 | 3/2010 | Moudy et al. | |
| 2010/0179844 A1* | 7/2010 | LaFergola | G07C 5/008 701/31.4 |
| 2011/0271108 A1* | 11/2011 | Kale | G06F 21/10 713/168 |
| 2012/0166818 A1* | 6/2012 | Orsini | H04L 9/085 713/193 |
| 2014/0317760 A1 | 10/2014 | Gold et al. | |
| 2015/0126151 A1 | 5/2015 | Madala et al. | |
| 2015/0372997 A1* | 12/2015 | Lokamathe | H04L 63/062 713/171 |
| 2016/0205554 A1* | 7/2016 | Cagle | H04W 4/90 455/411 |
| 2017/0111327 A1* | 4/2017 | Wu | H04L 63/101 |

FOREIGN PATENT DOCUMENTS

| | | |
|---|---|---|
| CN | 102595340 A | 7/2012 |
| CN | 103516591 A | 1/2014 |
| CN | 104079548 | 10/2014 |

OTHER PUBLICATIONS

Chinese first search global dossier for Chinese patent application No. 2015103693834 dated Aug. 24, 2017, 1 page.

Machine translation of the second Chinese Office Action dated Jul. 5, 2018 for Chinese patent application No. 201510369383.4, a foreign counterpart application of U.S. Appl. No. 15/189,825, 7 pages.

Machine translation of the first Chinese Office Action dated Oct. 26, 2017 for Chinese patent application No. 201510369383.4, a foreign counterpart application of U.S. Appl. No. 15/189,825, 7 pages.

* cited by examiner

MANAGEMENT OF DATA OF USER GROUPS AND MAINTENANCE OF COMMUNICATION THEREOF

CROSS REFERENCE TO RELATED PATENT APPLICATIONS

This application claims priority to Chinese Patent Application No. 201510369383.4, filed on Jun. 26, 2015, entitled "Methods and Apparatuses for Management of Group User Information and Maintenance of Instant Messaging Group," which is hereby incorporated by reference in its entirety.

TECHNICAL FIELD

The present disclosure relates to the field of communication technology, and more particularly to methods and devices for management of group user data and/or maintenance of instant messaging groups.

BACKGROUND

An enterprise often has a large number of employees located in different business departments and performing different tasks. When there are a large number of employees and the organizational structure of the enterprise is complex, it is difficult for an individual employee to know other employees. For example, if an employee needs to contact co-workers with whom the employee is unfamiliar, the employee may view group contacts of the enterprise to obtain contact information of the co-workers and to contact these co-workers.

SUMMARY

Implementations herein related to methods and devices for management of group user data and/or maintenance of instant messaging groups. The implementations may enable users to view group contacts of an enterprise and control access to improve security of group data of the enterprise and to avoid leakage of communication information of group users of the enterprise. This Summary is not intended to identify all key features or essential features of the claimed subject matter, nor is it intended to be used alone as an aid in determining the scope of the claimed subject matter.

To achieve the above object, the implementations provide the following technical schemes.

According to an aspect of the present disclosure, the implementations provide a method for management of group user data. The method may include receiving, by a computing device, a request for searching data of a first group user. For example, the request may be initialized by a second group user via an instant messaging application. The computing device may determine a data search permission of the second group user on the data of the first group user, select a data item of the first group user in accordance with the data search permission, and return the data item to the second group user.

According to another aspect of the present disclosure, the implementations provide a device for management of group user data. The device may include a first receiving module configured to receive a request for searching data of a first group user. The request may be initialized by a second group user via an instant messaging application. The device may further include a determining module configured to determine a data search permission of the second group user on the data of the first group user, and a selecting module configured to select a data item of the first group user in accordance with the data search permission and to return the data item to the second group user.

According to another aspect of the present disclosure, the implementations provides a method for maintenance of an instant messaging group. The method may include receiving, by a computing device, an editing command for group contacts. For example, the editing command may be initialized by an administrative user of a group via a group contact page of an instant messaging application. When the editing command is applied to updating of a community organization, the computing device may update the instant messaging group associated with the community organization based on updated status of the community organization.

According to another aspect of the present disclosure, the implementations provides a device for maintenance of an instant messaging group. The device may include a command receiving module configured to receive an editing command for group contacts. For example, the editing command may be initialized by an administrative user of a group via a group contact page of an instant messaging application. The device may further include an updating module configured to update the instant messaging group associated with the community organization based on updated status of the community organization when the editing command is applied to updating of a community organization.

As seen in above technical solutions, the present disclosure incorporates group contacts into mobile devices to achieve a more efficient management of the group contacts in a mobile environment as compared to conventional techniques. Meanwhile, by determination of data search permission, appropriate permissions may be obtained for individual group users to avoid disclosure and unlimited searches of group data. This helps to improve information security of the community.

BRIEF DESCRIPTION OF THE DRAWINGS

The Detailed Description is described with reference to the accompanying figures. The use of the same reference numbers in different figures indicates similar or identical items.

DETAILED DESCRIPTION

Figure 1:
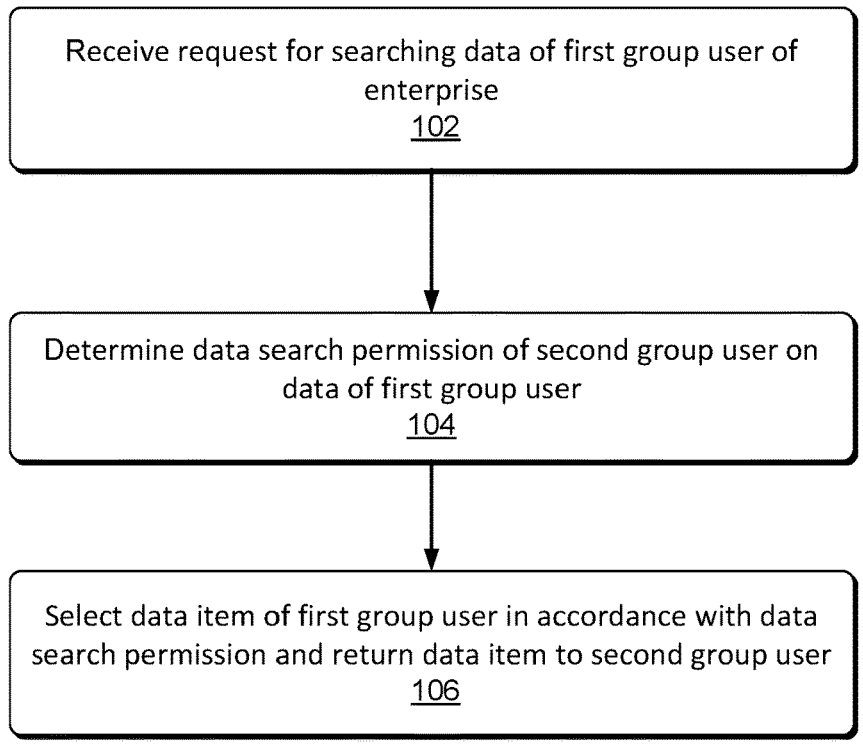
FIG. 1 is a schematic flow diagram illustrating a method for management of data of an enterprise in accordance with the implementations of the present disclosure.

FIG. 1 is a schematic flow diagram illustrating a method 100 for management of data of an enterprise in accordance with the implementations of the present disclosure. As shown in FIG. 1, the method 100 is implemented by a computing device (e.g., a server). The method 100 may include the following operations.

At 102, the server may receive a request for searching data of a first group user of an enterprise. The request may be initiated by a second group user of the enterprise via a group contact page of the instant messaging application. In other implementations, the second group user may use other methods for searching data of the first group user. For example, using a global search function, the second group user may initialize the search request by inputting information such as a fuzzy name, a mailbox, an employee number etc.

In implementations, the instant messaging application may be any application that enables instant messaging such as Enterprise Instant Messaging (EIM), for example, Ding-Talk. In these instances, as the Internet continues to develop, instant messaging applications have become a communication tool that people widely used and been increasingly used in mobile devices. Accordingly, combination of instant messaging applications and group contacts of an enterprise can save corresponding equipment costs, maintenance costs and time costs as compared to management of group contacts by specialized personnel and devices. This further helps the enterprise to develop mobile enterprise management.

At 104, the server may determine a data search permission of the second group user on the data of the first group user.

At 106, the server may select a data item of the first group user in accordance with the data search permission and return the data item to the second group user.

In implementations, the server may configure a data search permission of a group user and select a data item corresponding to the data search permission for the group user. This may avoid disclosure and unlimited searches of group data and help to improve information security of the enterprise.

It should be noted that, in the implementations of the present disclosure, "group users of an enterprise" and "group contacts of an enterprise" are only used as examples for descriptions. The implementations of the present disclosure may apply to other enterprises and organizations to obtain corresponding group users and group contacts. This present disclosure is not limited by these descriptions.

Figure 2:
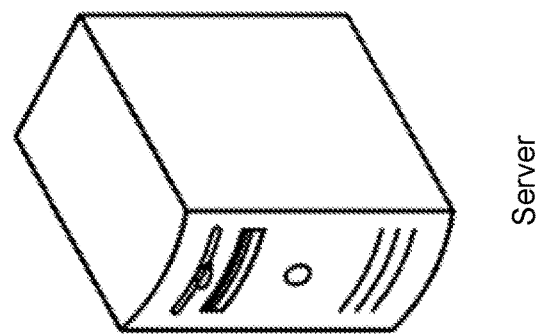
FIG. 2 is a schematic view of a computing environment in accordance with the implementations of the present disclosure.
Figure 2:
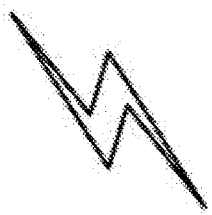
Figure 2:
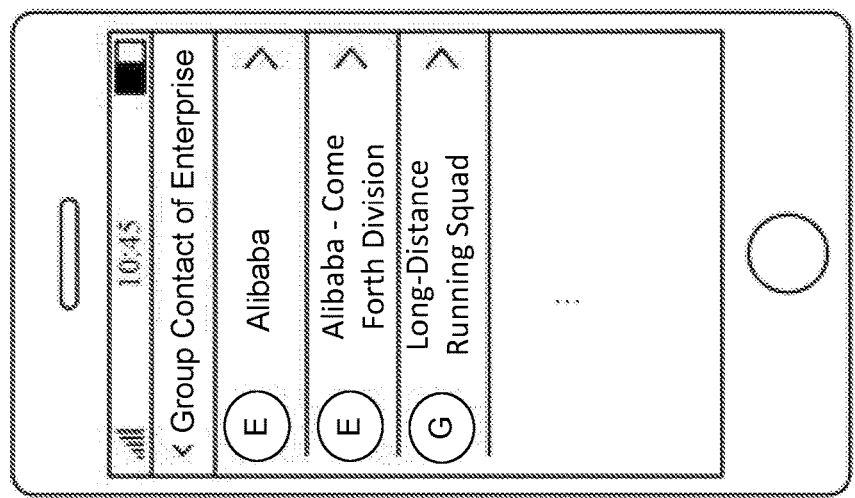

FIG. 2 is a schematic view of a computing environment 200 in accordance with the implementations of the present disclosure. As illustrated in FIG. 2, a group user may log in an account on a mobile device and exchange data with a server. The group user may search group contacts of an enterprise related to the group user (e.g., an employee of the enterprise).

In implementations, the group contacts may be presented in a form of mobile contacts. For example, the group contacts may be displayed in an alphabetical order by their names. All employees may be ordered and then the group user may select an employee that the group user desires to view. Detailed information of the selected employee may be presented further. Alternatively, as illustrated in FIG. 2, according to an organizational structure of the enterprise, the server may form a corresponding contact entry in the group contacts. For example, in FIG. 2, "Alibaba" corresponds to all employees of Alibaba. "Alibaba—come forth division" corresponds to employees of the come forth division of Alibaba. In general, the division refers to a department to which the current group user belongs. This facilitates the group user to perform a search operation. In some implementations, the group contacts may also apply to group contacts of an enterprise or a division as well as to other organizations similar to an enterprise such as "long-distance running squad" shown in FIG. 2. In implementations, group contacts are different from general mobile contacts. User terminals typically do not save or persist data of the group contacts, but perform real-time queries to the server. In implementations, the cache may be cleared to secure user data of the enterprise when the group user exits the current terminal.

Figure 3:
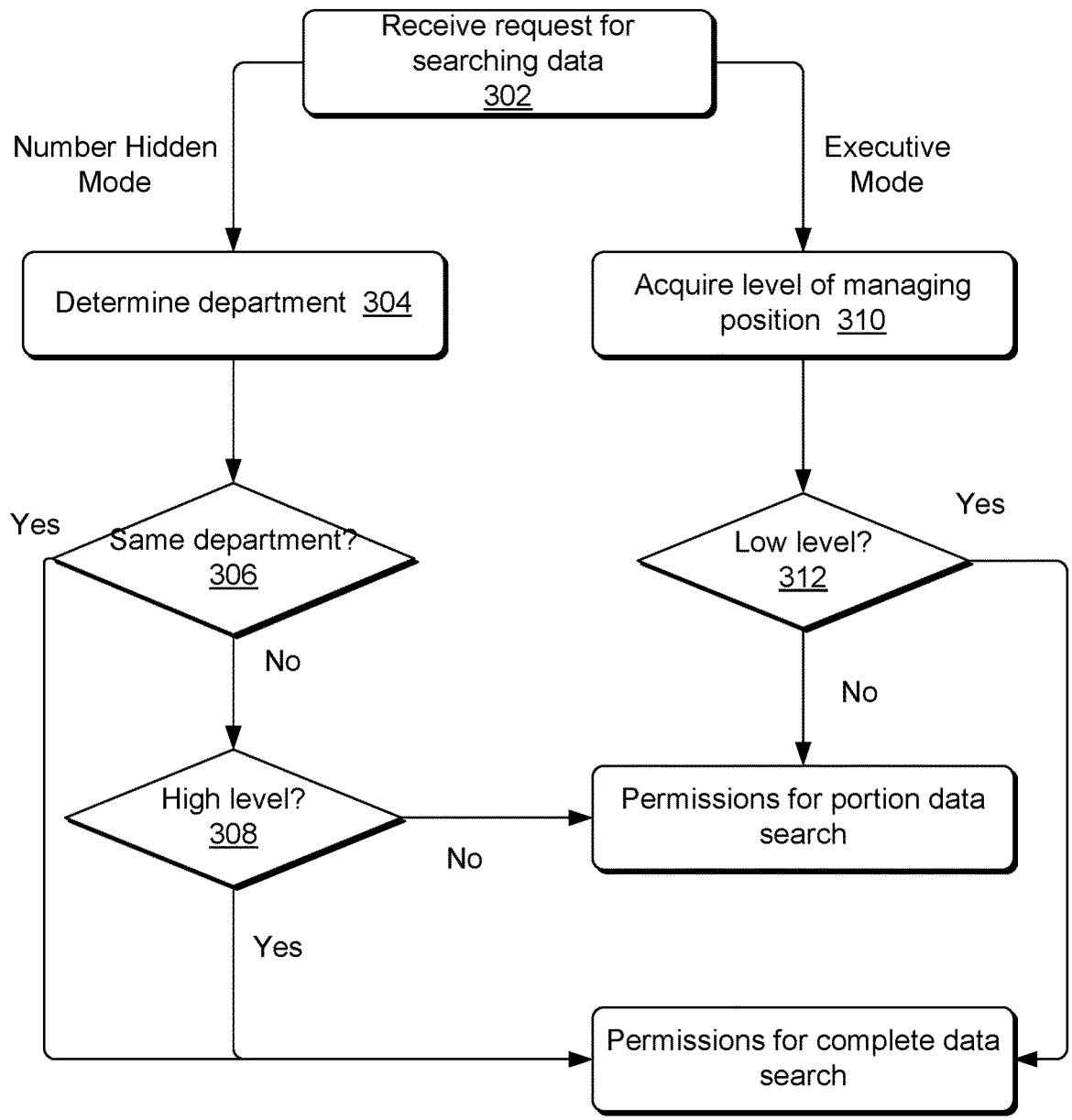
FIG. 3 is another schematic flow diagram illustrating a method for management of data of another enterprise in accordance with the implementations of the present disclosure.

In accordance with the scenario shown in FIG. 2, FIG. 3 is a schematic flow diagram illustrating a method 300 for management of data of another enterprise in accordance with the implementations of the present disclosure. As illustrated in FIG. 3, the method 300 may include the following operations.

At 302, a server may receive a request for searching data of a first group user of an enterprise from any group user of the enterprise.

In implementations, for purposes of illustration, the server may receive a request for searching data of group user A of an enterprise from group user B of the enterprise. The request may be initiated by the group user B via a group contact page of the instant messaging application. In implementations, "Group contact page" refers to all pages related to group contacts of the enterprise such as details contact information of a group user of the enterprise, while not limited by the information illustrated in FIG. 2.

In implementations, to improve security of the group contacts, the implementations provide, on the basis of the mobile contact management, two options of management modes: a number hidden mode and an executive mode. In some implementations, a group user may edit data of the group user in the group contacts using mobile devices.

Figure 4:
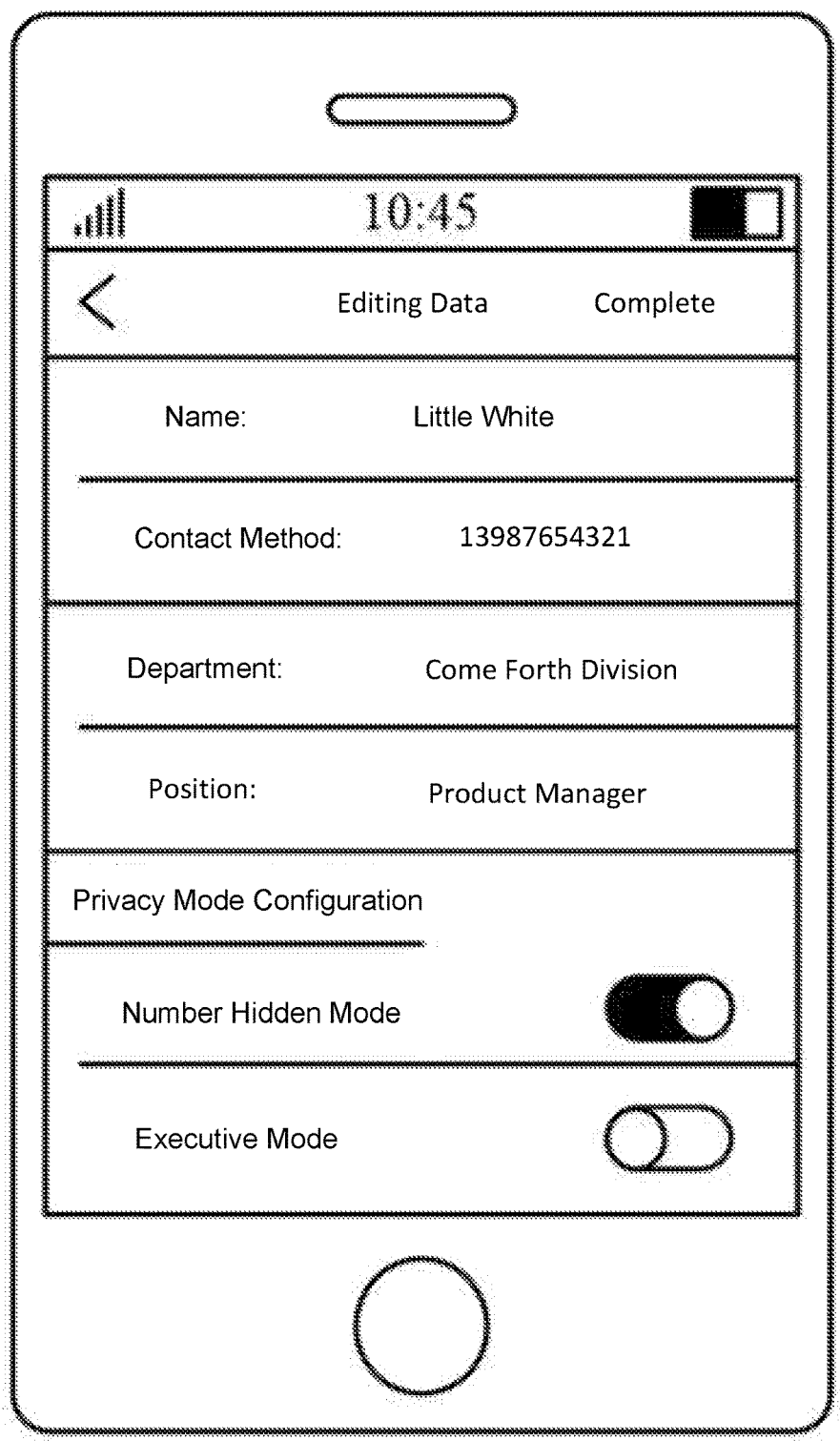
FIGS. 4 and 5 are diagrams illustrating user interfaces for management of data of an enterprise in accordance with the implementations of the present disclosure.
Figure 5:
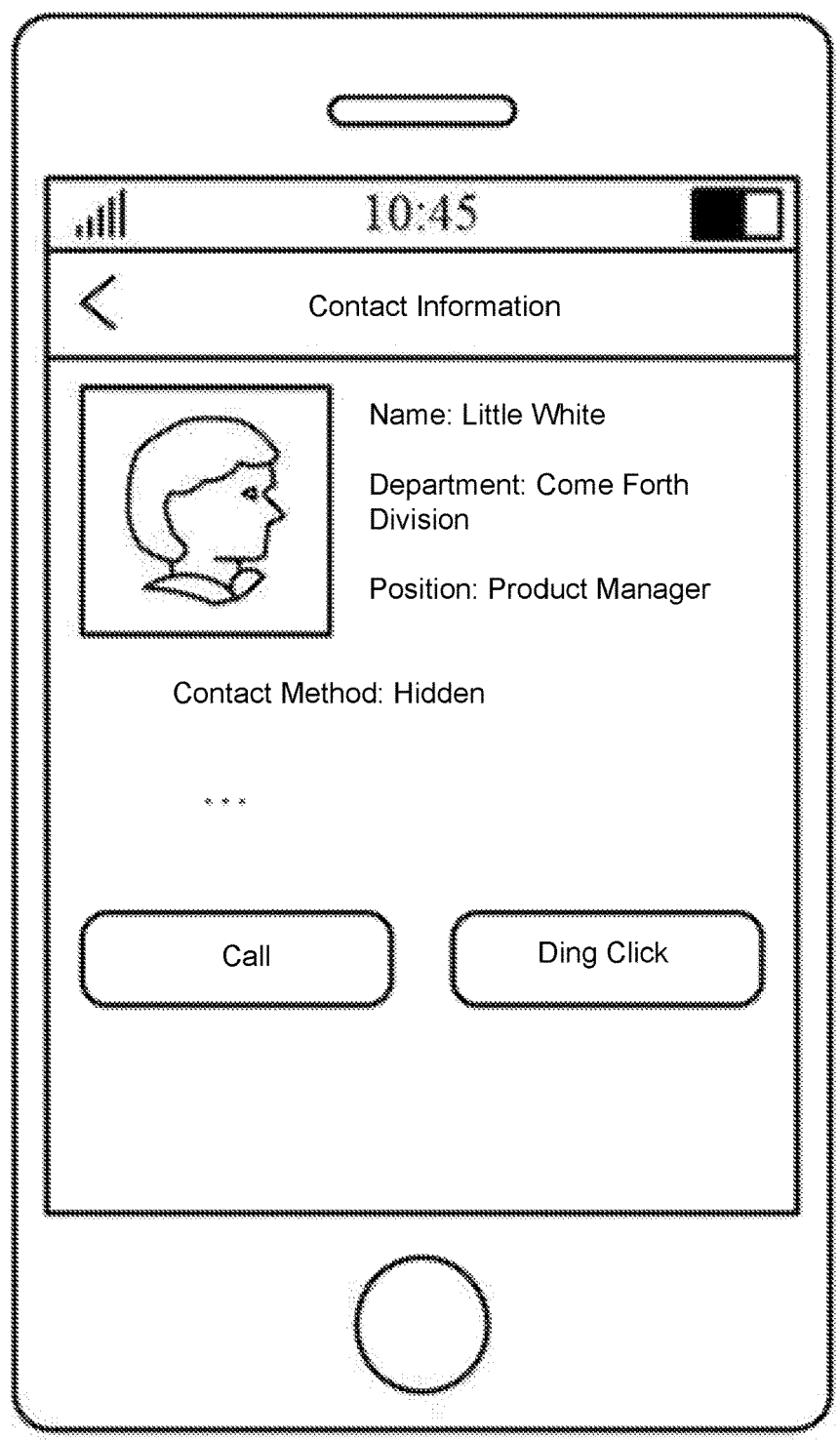

FIGS. 4 and 5 are diagrams illustrating user interfaces 400 and 500 for management of data of an enterprise in accordance with the implementations of the present disclosure.

As illustrated in FIG. 4, when a group user "little white" edits data, the group user may choose whether to enable a privacy mode and to enable a type of the privacy mode: a numbers hidden mode or an executive mode. Alternatively, in other implementations, via assignment of permissions, the server may assign a data search permission to the group user to enable the group user to have privileges of an "administrator". For example, the group user may edit data of other group users via the interfaces illustrated in FIG. 4 and choose whether to enable a privacy mode: a numbers hidden mode or an executive mode. In these instances, ordinary employees may not edit their data without limitations. This helps data management and maintenance of the group contacts of the enterprise.

The following are described in detail. After the operation 302, the server may determine a corresponding initialized mode of the group user A. If the number hidden mode is initialized, the server may perform operation 304. If the executive mode is initialized, the server may perform operation 310.

1. Number Hidden Mode

At 304, the server may separately determine a department that the group user A and the group user B belong to under an organizational structure of the enterprise respectively.

At 306, the server may determine whether the group user A and the group user B belong to the same department. If the group user A and the group user B belong to the same department, the server may determine that the group user B has a permission for searching complete data of the group user A. If the group user A and the group B do not belong to the same department, the server may perform operation 308.

In these instances, the server may allow permissions for complete data search within these group users to facilitate regular communications between these group users and to help to improve communication efficiency because these group users may communicate for cooperation among group users of the same department.

Based on the organizational structure of the enterprise, the server may determine a defining unit for a department of the enterprise. For example, the server may define "project department" as a unit. In this instance, group users working on the same project belong to the same department, while group users working on different projects belong to different departments. Alternatively, the server may define a "project group" as a unit. In this instance, when the project includes multiple project groups, group users of the same project group belong to the same department, while group users working on the same project but different project groups belong to different departments.

Group users in different departments may not have much common ground in work and therefore may not be familiar with each other. In these instances, the server may impose certain restrictions among these group users to control access to their data to avoid leakage of information or harassment.

At 308, the server may separately obtain a level of a management position of the group user A and the group user B. If a level of a management position of the group user B is a first predetermined level, or the level of the management position of the group user B is higher than a level of a management position of the group user A, the server may determine that the group user B has a permission for searching complete data of the group user A. Otherwise, the server may determine that the data search permission of the group user B on the data of the group user A is irrelevant to an default data item.

In implementations, based on the organizational structure of the enterprise, there is a level of a management position corresponding to a group user in the organizational structure of the enterprise such as M1 level for general employees, M2 level for department managers, M3 level for department supervisors etc. If the group user A and the group user B belong to the same department, the server may assign a data search permission to group users with high levels to facilitate communications between enterprise leaders and employees.

"High level" can be defined using an absolute way. For example, if a level of a management position of a group user is a predetermined level such as M6 level, the server may determine the group user to be a high level employee. Alternatively, "high level" can be defined using a relative way. For example, the group user B's level is M5 level, while the group user A's level is M2 level. Since M5 level is 3 levels higher than the M2 level and the discrepancy (i.e., 3 levels) is greater than a predetermined value (e.g., a random integer), the server may determine that the group user B is the high level employee as compared with the group user A.

In implementations, in accordance with the "number hidden mode" illustrated in FIG. 4, the data search permission may be described as follow. The group user B has no data search permission on "contact information (e.g., mobile phone numbers)" of the group user A to avoid leakage of the contact information of the group user A or harassment on the group user A by the group user B. As illustrated in FIG. 5, suppose that the group user A is "little white." When the group user B search the contract information of the group user A in the group contacts of the enterprise, the "contact information" may be displayed as "hidden," false information or other information. The real contact information of the group user A will not be displayed.

In implementations, in addition to selectively hiding the contact information of the group user A, the server may impose default permissions on other default data items. For example, the server may set "position hidden mode." When the "post hidden mode" is turned on and the group user B does not satisfy a certain condition, the group user B does not have the data search permission on the "position" of the group user A in the enterprise. For example, as illustrated in FIG. 5, information of a group user is presented in a user interface and "product manager" may not be displayed in the column of the "position."

It should be noted that: 1) operation 308 is not necessary. When operation 308 is not included, the server may determine that the data search permission of the group user B on the data of the group user A is irrelevant to the default data item if the operation 306 determines that the group user A and the group user B belong to different departments. In these instances, the server may allow permissions for a portion of data search of data of the group user A. 2). As illustrated in FIG. 5, while the group user B may not, in the user interface, view the contact information of the group user A, the group user B may still communicate with the group user A.

The group user B may click "Call" or "Ding Click," as illustrated in FIG. 5, to make a request to the server for communicating with the group user A using a mobile device. When the server receives the request, the server may separately obtain the contact information of the group user A and the group user B. The server may then establish a communication channel between the group user A and the group user B. In these instances, through an intermediary role of the server, while the group user B does not have the permission to view the contact information of the group user A, the group user B can communicate with the group user A. This ensures necessary corporation while avoiding leakage of the contact information of the group user A to the group user B. In some implementations, the communication method between the group user A and the group user B may be determined by a trigger key initialized by the group user B. The present disclosure does not limit types of communication methods.

2. Executive Mode

At 310, the server may separately obtain a level of a management position of the group user A and the group user B.

At 312, when the level of the management position of the group user B is lower than the level of the management position of the group user A, and a discrepancy of levels between the first group user and the second group user is greater than a predetermined value, the server may determine that the data search permission of the group user B on the data of the group user A is irrelevant to a default data item.

In implementations, high level group users (e.g., leaders of the enterprise) are often busy, and do not want to be disturbed randomly. Therefore, enabling executive mode avoids disclosure and/or leakage of contact information of the high level group users to other group users.

For example, suppose that the group user B is an employee with level M1 and the group user A is a manager with level M3. Further suppose that the predetermined number is 1, and M3 level is 2 levels higher than the M1 level. When the group user B searches the contract information of the group user A in the group contacts of the enterprise, as illustrated in FIG. 5, the group user B may not view the contract information of the group user A.

In instances, the group user B clicks "Call" or "Ding Click," as illustrated in FIG. 5, to send the server a communication request. The server determines that the data search permission of the group user B on the data of the group user A is irrelevant to the default data item and therefore ignore or decline the communication request to completely avoid interference from low levels group users and to avoid leakage of the contact information of high level group users.

In addition, similar to "Number hidden mode," the server may set permission configuration to hide other information in addition to the contact information in the "executive model" to make the information not available to low level group users.

Figure 6:
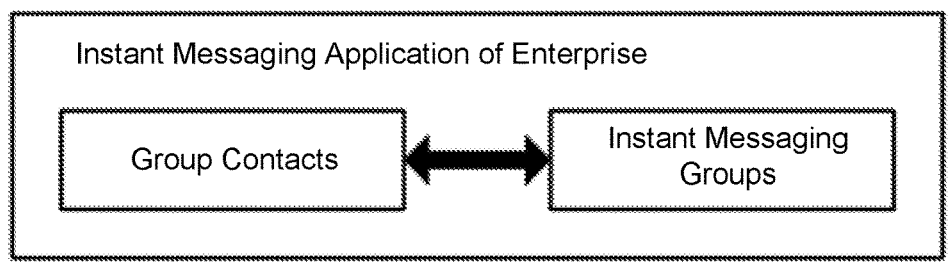
FIG. 6 is a diagram illustrating information synchronization between contacts of an enterprise and instant message groups in accordance with the implementations of the present disclosure.

FIG. 6 is a diagram 600 illustrating information synchronization between contacts of an enterprise and instant message groups in accordance with the implementations of the present disclosure. As illustrated in FIG. 6, in implementations, the synchronization combines instant messaging application and group contacts of an enterprise. The instant messaging application has an original function of instant messaging, and there are corresponding instant messaging groups. These message groups may be formed based on the enterprise organizational structure (e.g., an instant messaging group for an individual department of the enterprise) or by group users from different departments for other reasons.

Figure 7:
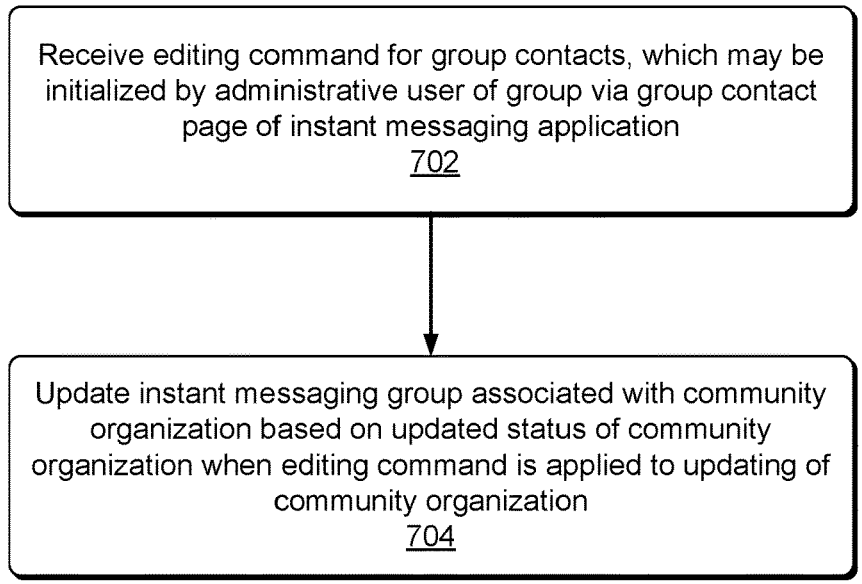
FIG. 7 is a schematic flow diagram illustrating a method for maintenance of instant messaging groups in accordance with the implementations of the present disclosure.

FIG. 7 is a schematic flow diagram 700 illustrating a method for maintenance of instant messaging groups in accordance with the implementations of the present disclosure. The method is implemented by a computing device (e.g., a server). The method may include the following operations.

At 702, the server may receive an editing command for group contacts, which may be initialized by an administrative user of a group via a group contact page of an instant messaging application.

At 704, the server may update the instant messaging group associated with a community organization based on updating status of the community organization when the editing command is applied to updating of the community organization.

In these instances, the server may receive the editing command for the group contacts, and the editing command may be initialized by an administrative user of the group via the group contact page of the instant messaging application. Accordingly, when the editing command is applied to updating of the community organization, based on updated status of the community organization, the server may update the instant messaging group associated with the community organization. Objects of the editing command may be a group user or a department of the enterprise. Editing methods may include adding, deleting or changing etc.

In these instances, a group user may be recorded in the group contacts of the enterprise and in one or more instant messaging groups. The group user may edit data of the group user in the group contacts. In other words, the instant message group may be updated automatically. For example, when an administrative user of the enterprise deletes a group user from the group contacts, the server may delete the group user from all instant messaging groups of the enterprise. When the administrative user of the enterprise changes a department of a group user from 1 to 2 in the group contacts, the server may change an instant messaging group corresponding the department 1 to another instant messaging group corresponding to the department 2. When the administrative user of the enterprise adds a group user in the group contacts, the server may, based on information of the department that the group user belongs to and according to the organizational structure of the enterprise, add the group user automatically to at least one corresponding instant messaging group.

Accordingly, the present disclosure breaks a barrier between group contacts and instant messaging groups and achieves data consistency between the group contacts and the instant messaging groups. This further avoids repeated operations on the group contacts and the instant messaging groups (e.g., deletion in both the group contacts and the instant messaging groups for an employee who departed from the enterprise). This also avoids safety risk due to leaking operations (e.g., an employee who departed from the enterprise). For example, such employee has departed the enterprise and therefore is deleted from the group contacts of the enterprise. However, the employee may not be deleted from an instant messaging group such that information of the instant messaging group may be at risk.

In implementations, an "administrative user of enterprise" refers to a group user who has administrative privileges to manage the group contacts of the enterprise and functions as an "administrator." The group user may become an "administrative user" of the enterprise based on information of the department that the group user belongs to according to the organizational structure of the enterprise or based on permissions assigned by high level group users.

In implementations, when receiving an editing command for group contacts, the server may determine a level of an editing object corresponding to the editing command in the community organization. When a level of a management permission is not lower than the level of the editing object, the server may execute the editing command; otherwise, the server may ignore or decline the editing command. In these instances, by comparison and judgment of managing privilege levels, the server may enable the administrative user to manage the group contacts of the enterprise within the scope of the assigned permissions and enable group users with high level managing positions to manage their information of the group contact of the enterprise. This further ensures information security of the high level group users.

Figure 8:
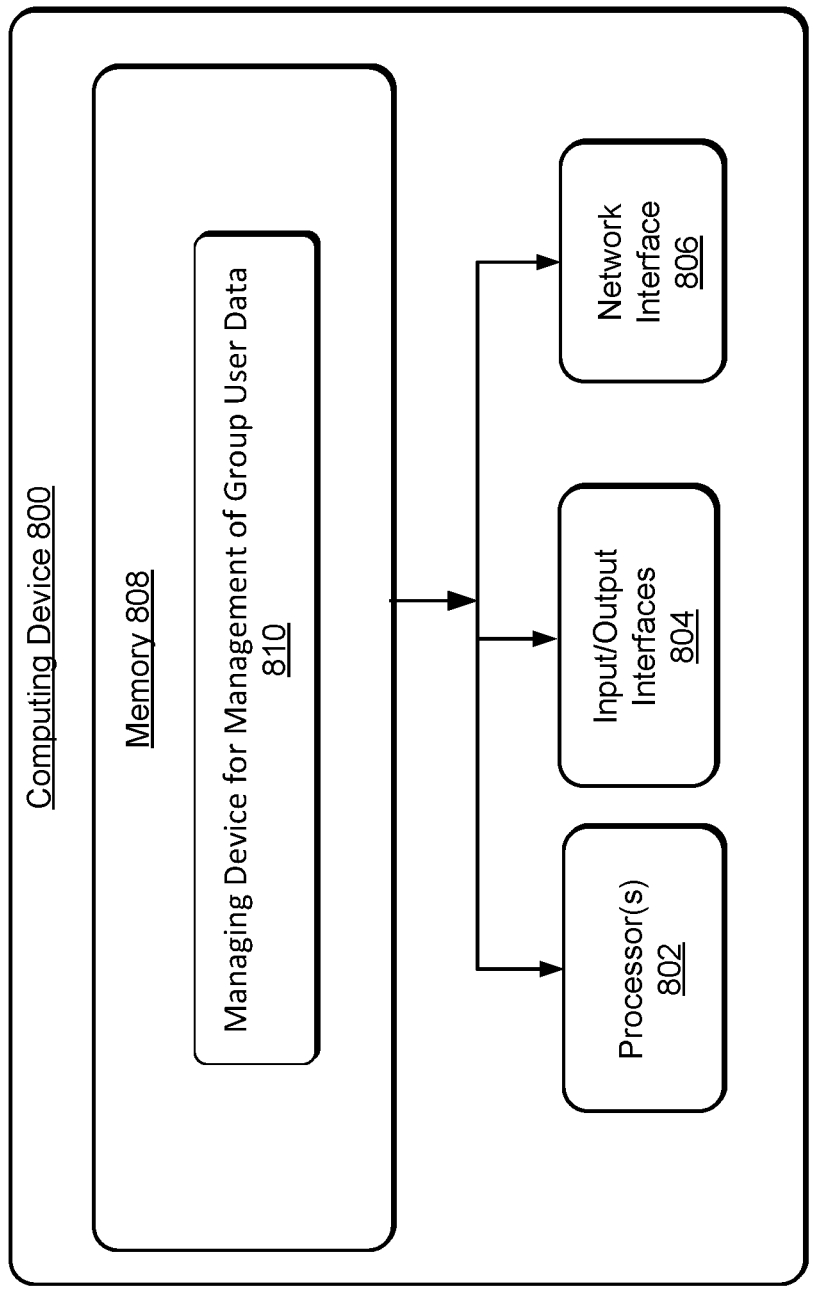
FIG. 8 is a schematic view of a computing device in accordance with the implementations of the present disclosure.

FIG. 8 is a schematic view of a computing device in accordance with the implementations of the present disclosure. On the hardware level, FIG. 8 is a diagram of a computing device 800. The computing device 800 may be a user device or a server for management of group user data. In an exemplary configuration, the computing device 800 includes one or more processors 802, input/output interfaces 804, network interface 806, and memory 808.

The memory 808 may include computer-readable media in the form of volatile memory, such as random-access memory (RAM) and/or non-volatile memory, such as read only memory (ROM) or flash RAM. The memory 808 is an example of computer-readable media.

Computer-readable media includes volatile and non-volatile, removable and non-removable media implemented in any method or technology for storage of information such as computer readable instructions, data structures, program modules, or other data. Examples of computer storage media include, but are not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that may be used to store information for access by a computing device. As defined herein, computer-readable media does not include transitory media such as modulated data signals and carrier waves.

Figure 9:
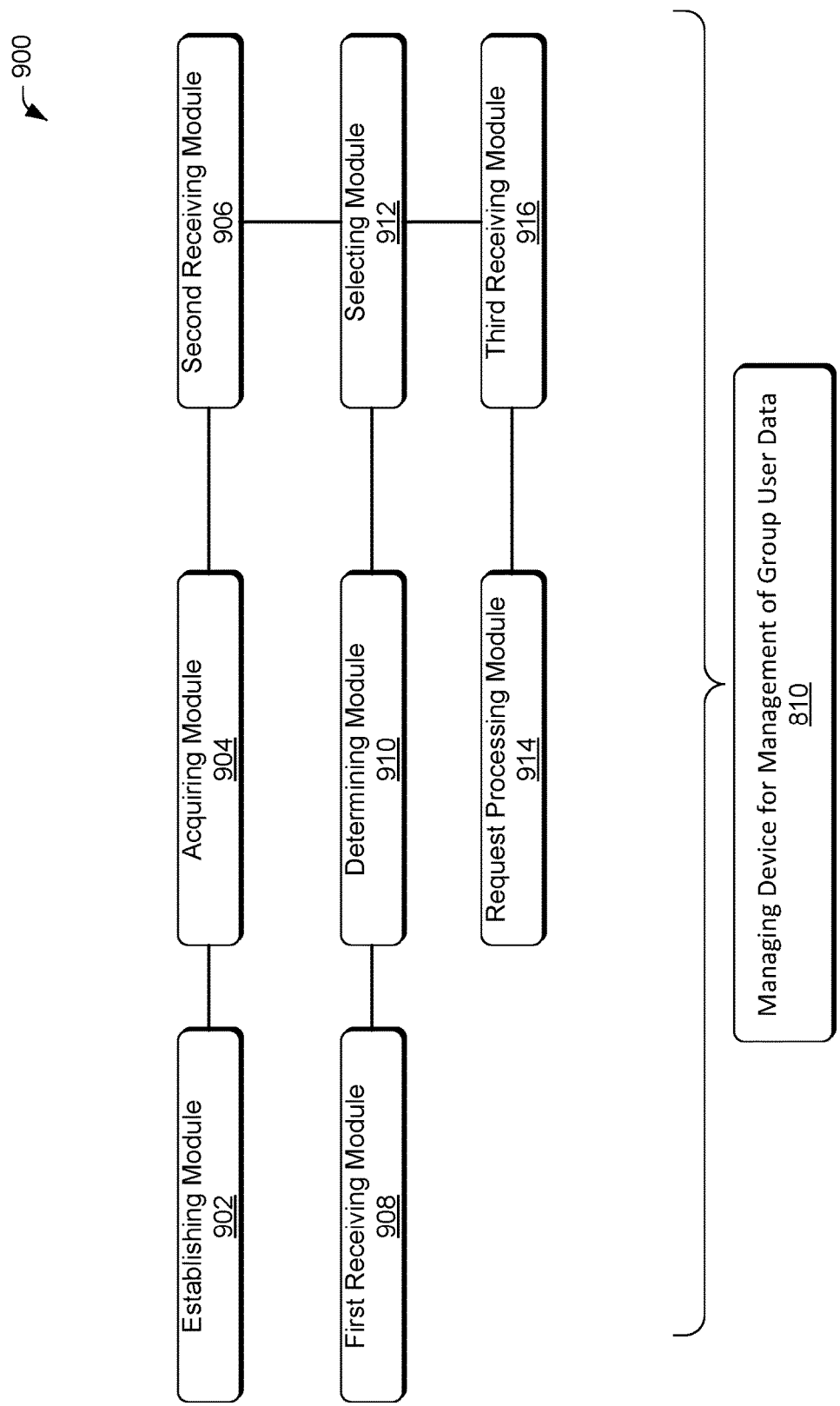
FIG. 9 is a block diagram illustrating a device for management of data of an enterprise in accordance with the implementations of the present disclosure.

Turning to the memory 808 in more detail, the memory 808 may include a managing device for management of group user data 810, which is further described in FIG. 9. FIG. 9 is a block diagram illustrating a device 900 for management of data of an enterprise in accordance with the implementations of the present disclosure.

As illustrated in FIG. 9, the managing device 900 may include an establishing module 902, an acquiring module 904, a second receiving module 906, a first receiving module 908, a determining module 910, a selecting module 912, a request processing module 914, and a third receiving module 916.

The first receiving module 902 may be configured to receive a request for searching data of a first group user. For example, the request may be initialized by a second group user via an instant messaging application.

The determining module 910 may be configured to determine a data search permission of the second group user on the data of the first group user.

The selecting module 912 may be configured to select a data item of the first group user in accordance with the data search permission and return the data item to the second group user.

In implementations, the determining module 910 is configured to further separately obtain a group department that the first group user and the second group user belong to under an organizational structure when a hidden model of a default data item for the first group user has started. When the group department that the first group user belongs to and the group department that the second group user belongs to are different group departments, the determining module 910 may further determine that the data search permission of the second group user on the data of the first group user is irrelevant to the default data item.

In implementations, the determining module 910 is further configured to determine that the second group user has a permission for searching complete data of the first group user when the group department that the first group user belongs to and the group department that the second group user belongs to are different group departments and if a level of a management position of the second group user is a first predetermined level or the level of the management position of the second group user is higher than a level of a management position of the first group user.

In implementations, the second receiving module 906 may be configured to receive a request for communicating with the first group user. The request may be initiated by the second group user via a group contact page of the instant messaging application. The data search permission of the second group user on the data of the first group user is irrelevant to the default data item, and the group contact page does not show contact information of the first group user.

The acquiring module 904 may be configured to separately obtain contact information of the first group user and the second group user.

The establishing module 902 may be configured to establish a communication connection between the first group user and the second group user based on the contact information.

In implementations, the determining module 910 is configured to further separately obtain a level of a management position of the first group user and the second group user under an organizational structure of the enterprise when an executive protection model for the first group user has started. When the level of the management position of the second group user is lower than the level of the management position of the first group user, and a discrepancy of the level of management position between the first group user and the second group user is greater than a predetermined value, the determining module 910 may determine that the data search permission of the second group user on the data of the first group user is irrelevant to the default data item.

In implementations, the third receiving module 916 may be configured to receive a request for communicating with the first group user. The request may be initiated by the second group user via a group contact page of the instant messaging application.

The request processing module 914 may be configured to ignore or decline the communication request when the data search permission of the second group user on the data of the first group user is irrelevant to the default data item.

In implementations, the default data item may include contact information.

In implementations, the instant messaging application is a group instant messaging application.

Figure 10:
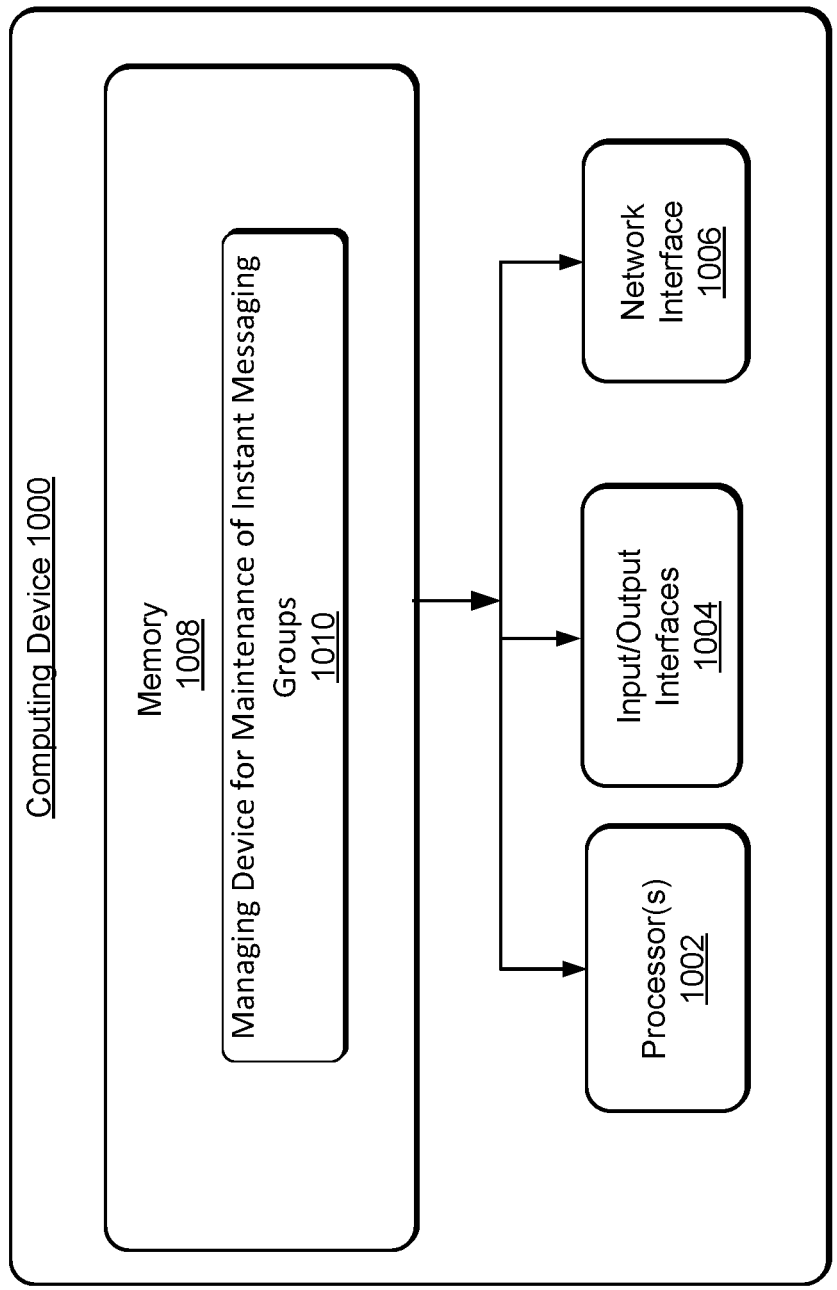
FIG. 10 is another schematic view of another computing device in accordance with the implementations of the present disclosure.

FIG. 10 is a schematic view of another computing device in accordance with the implementations of the present disclosure. On the hardware level, FIG. 10 is a diagram of a computing device 1000. The computing device 1000 may be a user device or a server for maintenance of instant messaging groups. In one exemplary configuration, the computing device 1000 includes one or more processors 1002, input/output interfaces 1004, network interface 1006, and memory 1008.

The memory 1008 may include computer-readable media in the form of volatile memory, such as random-access memory (RAM) and/or non-volatile memory, such as read only memory (ROM) or flash RAM. The memory 1008 is an example of computer-readable media.

Computer-readable media includes volatile and non-volatile, removable and non-removable media implemented in any method or technology for storage of information such as computer readable instructions, data structures, program modules, or other data. Examples of computer storage media include, but are not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that may be used to store information for access by a computing device. As defined herein, computer-readable media does not include transitory media such as modulated data signals and carrier waves.

Figure 11:
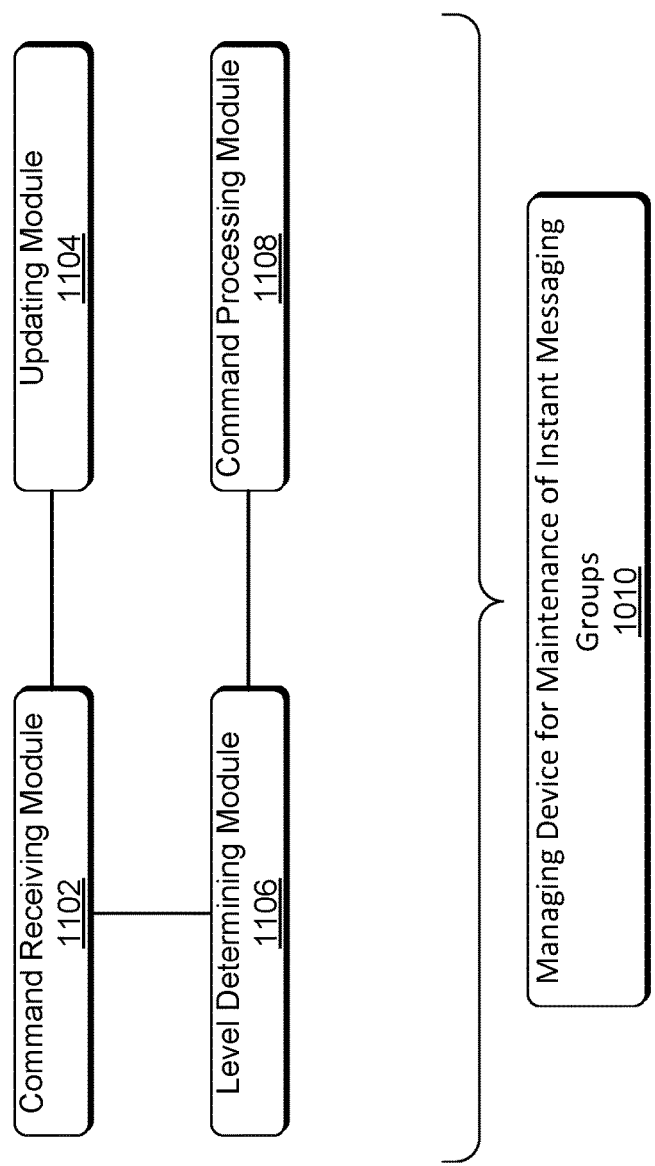
FIG. 11 is a block diagram illustrating a device for maintenance of instant messaging groups in accordance with the implementations of the present disclosure.

Turning to the memory 1008 in more detail, the memory 1008 may include a maintenance device for maintenance of instant messaging groups, which is further described in FIG. 11. FIG. 11 is a block diagram illustrating a device 1100 for maintenance of instant messaging groups in accordance with the implementations of the present disclosure.

As illustrated in FIG. 11, the maintenance device 1100 may include a command receiving module 1102, an updating module 1104, a level determining module 1106, and a command processing module 1108.

The command receiving module 1102 may be configured to receive an editing command for group contacts, which may be initialized by an administrative user of a group via a group contact page of an instant messaging application.

The updating module 1104 may be configured to update the instant messaging group associated with the community organization when the editing command is applied to updating of a community organization based on updated status of the community organization.

In implementations, the level determining module 1106 may be configured to determine a level of an editing object corresponding to the editing command in the community organization.

The command processing module 1108 may be configured to execute the editing command when a level of a management permission is not lower than the level of the editing object. The command processing module 1108 may ignore or decline the editing command when a level of a management permission is lower than the level of the editing object.

Moreover, the term "comprising", "including" or any other variation thereof are intended to cover a non-exclusive inclusion such that a series of factors including the process, method, article or device include not only those elements, but may include other elements not expressly listed or for inherent features. In the absence of additional restrictions, the statement "including a" defining element does not exclude the existence of additional identical elements in elements, methods, articles, or apparatuses.

The embodiments are merely for illustrating the present disclosure and are not intended to limit the scope of the present disclosure. It should be understood for persons in the technical field that certain modifications and improvements may be made and should be considered under the protection of the present disclosure without departing from the principles of the present disclosure.

What is claimed is:

1. A method for management of group user data, the method comprising:
   receiving, by one or more processors of a computing device, a request for searching contact information of a first group user, the request initialized by a second group user via an instant messaging application;
   determining, by the one or more processors, a data search permission of the second group user on the contact information of the first group user;
   in response to determining, by the one or more processors, that the second group user is not permitted to access and view the contact information of the first group user based on the data search permission:
   returning, by the one or more processors, information other than the contact information of the first group user to a computing device associated with the second group user, the information including a call button that enables the second group user to make a request for communicating with the first group user;
   receiving, by the one or more processors, the request from the second group user for communicating with the first group user;
   separately obtaining, by the one or more processors, contact information of the second group user and the contact information of the first group user; and
   establishing, by the one or more processors, a communication connection between the computing device associated with the second group user and a computing device associated with the first group user based on the contact information of the second group user and the contact information of the first group user.

2. The method of claim 1, wherein determining the data search permission of the second group user on the contact information of the first group user comprises:
   separately determining a group department that the first group user belongs to and a group department that the second group user belongs to under an organizational structure respectively when a hidden mode of a default data item for the first group user has been set; and
   determining that the data search permission of the second group user on the contact information of the first group user is irrelevant to the default data item when the group department that the first group user belongs to and the group department that the second group user belongs to are different group departments.

3. The method of claim 2, wherein determining the data search permission of the second group user on the contact information of the first group user comprises:
   determining that the second group user has no permission for searching complete data of the first group user if a level of a management position of the second group user is lower than a level of a management position of the first group user, when the group department that the first group user belongs to and the group department that the second group user belongs to are different group departments.

4. The method of claim 1, wherein the determining the data search permission of the second group user on the contact information of the first group user comprises:
   separately obtaining a level of a management position of the first group user and a level of a management position of the second group user under an organizational structure when an executive protection mode for the first group user has set; and
   determining that the data search permission of the second group user on the contact information of the first group user is irrelevant to a default data item when the level of the management position of the second group user is lower than the level of the management position of the first group user and a discrepancy of levels of management positions between the first group user and the second group user is greater than a predetermined value.

5. The method of claim 2, wherein the default data item comprises the contact information of the first group user.

6. The method of claim 1, wherein the instant messaging application comprises a group instant messaging application.

7. A device for management of group user data, wherein the device comprising:
one or more processors; and
memory to maintain a plurality of components executable by the one or more processors, the plurality of components comprising:
  a first receiving module configured to receive a request for searching contact information of a first group user, the request initialized by a second group user via an instant messaging application,
  a determining module configured to determine a data search permission of the second group user on the contact information of the first group user,
  in response to the determining module determining that the second group user is not permitted to access and view the contact information of the first group user based on the data search permission:
    a selecting module configured to return information other than the contact information of the first group user to a computing device associated with the second group user, the information including a call button that enables the second group user to make a request for communicating with the first group user,
    a second receiving module configured to receive the request from the second group user for communicating with the first group user,
    an acquiring module configured to separately obtain contact information of the second group user and the contact information of the first group user, and
    an establishing module configured to establish a communication connection between the computing device associated with the second group user and a computing device associated with the first group user based on the contact information of the second group user and the contact information of the first group user.

8. The device of claim 7, wherein the determining module is further configured to:
separately determine a group department that the first group user belongs to and a group department that the second group user belongs to under an organizational structure respectively when a hidden model of a default data item for the first group user has started; and
determine that the data search permission of the second group user on the contact information of the first group user is irrelevant to the default data item when the group department that the first group user belongs to and the group department that the second group user belongs to are different group departments.

9. The device of claim 8, wherein the determining module is further configured to:
determine that the second group user has no permission for searching complete data of the first group user if a level of a management position of the second group user is lower than a level of a management position of the first group user, when the group department that the first group user belongs to and the group department that the second group user belongs to are different group departments.

10. The device of claim 7, wherein the determining module is further configured to:
separately obtain a level of a management position of the first group user and a level of a management position of the second group user under an organizational structure when an executive protection model for the first group user has started; and
determine that the data search permission of the second group user on the contact information of the first group user is irrelevant to a default data item when:
  the level of the management position of the second group user is lower than the level of the management position of the first group user, and
  a discrepancy of levels of management positions between the first group user and the second group user is greater than a predetermined value.

11. The device of claim 8, wherein the default data item comprises the contact information of the first group user.

12. The device of claim 7, wherein the instant messaging application comprises a group instant messaging application.

* * * * *